UNITED STATES PATENT OFFICE.

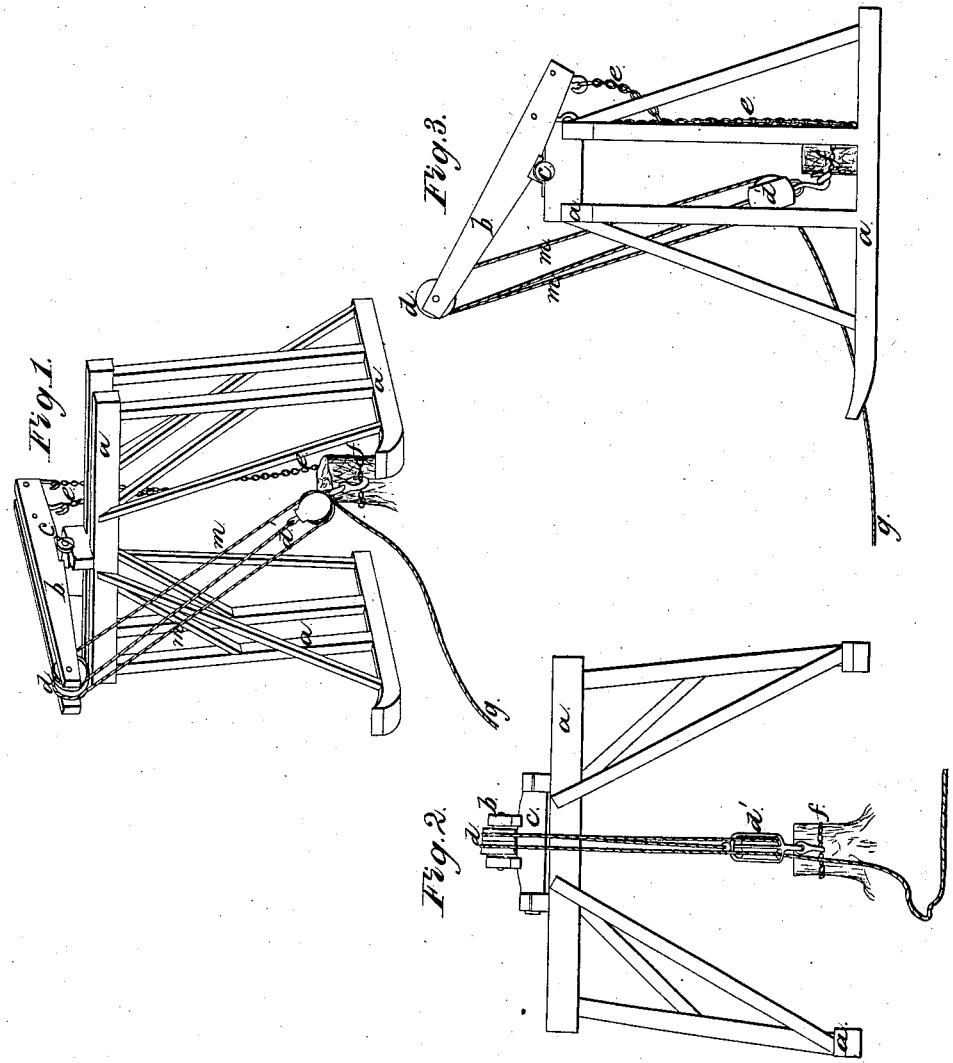

NATHAN PARRISH, OF GALESBURGH, MICHIGAN, ASSIGNOR TO GEORGE B. PETERS, OF SAME PLACE.

STUMP-EXTRACTOR.

Specification of Letters Patent No. 28,897, dated June 26, 1860.

*To all whom it may concern:*

Be it known that I, NATHAN PARRISH, of Galesburgh, in the county of Kalamazoo and State of Michigan, have invented certain new and useful Improvements in Grubbing-Machines; and I do hereby declare that the following is a full, clear, and exact description of the same, reference being had to the accompanying drawings and to the letters of reference marked thereon.

The nature of my invention consists in the arrangement of a rocking lever upon a frame in such manner that both of its ends may be attached to the stump or grub to be extracted substantially as will be hereinafter set forth.

In the annexed drawings Figure 1 represents a perspective of the machine, Fig. 2 is a front elevation, Fig. 3 is a side elevation.

In the figures, $a$, represents a frame which is made as strong as proper, and of any convenient or suitable size. I usually make the frame about ten feet in length, ten feet in width, and about six feet high.

$b$, represents the rocking lever which has its fulcrum about one-third of its length, and upon top of the frame as represented. One end of this lever is provided with hooks, or their equivalents to which a chain $e$, may be attached. The other end of the lever is provided with two or more pulleys $d$.

$f$ represents a chain, which passes around the stump or grub to be extracted.

$d'$, is a tackle block provided with a hook, which catches the chain $f$ around the stump.

$e$, represents a chain or cord which also catches in the chain $f$, at one end, the other end being secured to the hooks on the short end of the lever $b$.

$m$, represents a cord, one end of which is secured to the block $d'$. Said cord then passes around the pulleys on the lever, and those in the block in the usual manner, and power is applied to its other end.

In using this machine, the frame is placed over the stump or grub; and the chain $e$, and the block $d'$, are attached to the chain $f$, as is represented, the lever $b$, being in the position seen in Fig. 3. Power is then applied to the cord $m$, at $g$, and both ends of the lever $b$, are thus made to draw upon the stump at the same time.

It will be seen that by this arrangement all the power is derived from the lever which it is capable of exerting.

Having thus fully described my invention what I claim as new and desire to secure by Letters Patent is—

The arrangement of the rocking lever $b$, with the frame $a$, the cords $e$, and $m$, the tackle block $d'$, and with the chain or its equivalent, which passes around the stump or grub, in such a manner that power may be exerted by both ends of the lever, substantially as herein specified.

NATHAN PARRISH.

Witnesses:
 I. J. McCLELLAND,
 CHARLES PETERS.